(12) United States Patent
Lyu et al.

(10) Patent No.: US 7,265,802 B2
(45) Date of Patent: *Sep. 4, 2007

(54) LIQUID CRYSTAL DISPLAY WITH A WIDE VIEWING ANGLE USING A COMPENSATION FILM

(75) Inventors: Jae-Jin Lyu, Kyungki-do (KR); Chang-Hun Lee, Suwon (KR); Hak-Sun Chang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/520,540

(22) Filed: Sep. 13, 2006

(65) Prior Publication Data

US 2007/0008472 A1    Jan. 11, 2007

Related U.S. Application Data

(63) Continuation of application No. 10/713,426, filed on Nov. 17, 2003, now Pat. No. 7,123,329, which is a continuation of application No. 09/879,119, filed on Jun. 13, 2001, now Pat. No. 6,671,017.

(30) Foreign Application Priority Data

Jun. 13, 2000    (KR) ................. 2000-32506

(51) Int. Cl.
*G02F 1/1335*    (2006.01)
(52) U.S. Cl. ..................... 349/119; 349/120
(58) Field of Classification Search ........... 349/119, 349/120, 117
See application file for complete search history.

(56) References Cited

U.S. PATENT DOCUMENTS

| 5,734,455 | A | 3/1998 | Yoshida et al. |
|---|---|---|---|
| 6,084,651 | A | 7/2000 | Yamahara et al. |
| 6,108,064 | A | 8/2000 | Minoura et al. |
| 6,163,354 | A | 12/2000 | Yamahara et al. |
| 6,181,400 | B1 | 1/2001 | Yang et al. |
| 6,229,588 | B1 * | 5/2001 | Abileah et al. ............. 349/120 |
| 6,339,460 | B1 | 1/2002 | Saitoh |
| 6,342,938 | B1 | 1/2002 | Song et al. |
| 6,373,542 | B1 | 4/2002 | Yamahara et al. |
| 6,411,355 | B1 * | 6/2002 | Manabe et al. ............. 349/120 |
| 6,512,568 | B2 | 1/2003 | Song et al. |

(Continued)

*Primary Examiner*—Toan Ton
(74) *Attorney, Agent, or Firm*—Cantor Colburn LLP

(57) ABSTRACT

Disclosed is a liquid crystal display comprising a liquid crystal cell including a pair of transparent substrates, with orientation layers deposited on inner surfaces thereof, and a liquid crystal layer of liquid crystal material injected between the substrates; biaxial compensation films provided on outer surfaces of the liquid crystal cell, the biaxial compensation films including an optical dielectric material layer; and polarization plates provided on outer surfaces of the biaxial compensation films, wherein if "d" is set as a cell gap of the liquid crystal cell, "$R_{LC}$" is set as a phase retardation value of the liquid crystal layer, an axis perpendicular to planes made by the substrates is set as a z-axis, x-axis and y-axis are formed on a planar surface of the substrates, and refractive indices of molecules comprising the biaxial compensation films in the x, y and z directions are denoted by nx, ny and nz, retardation values (ny−nx)*d and (nz−nx)*d of the biaxial compensation films being respectively within ranges of −30±5 nm and −$R_{LC}$/4±15 nm.

8 Claims, 12 Drawing Sheets

U.S. PATENT DOCUMENTS

| | | |
|---|---|---|
| 6,567,143 B1 * | 5/2003 | VanderPloeg et al. ...... 349/120 |
| 6,646,701 B2 | 11/2003 | Lyu et al. |
| 6,665,032 B1 | 12/2003 | Kikkawa |
| 7,075,609 B2 * | 7/2006 | Ohmuro et al. ............. 349/130 |
| 2001/0043302 A1 | 11/2001 | Inoue et al. |
| 2001/0048497 A1 | 12/2001 | Mlyachi et al. |
| 2002/0021400 A1 * | 2/2002 | Lyu et al. ................... 349/178 |
| 2002/0063826 A1 | 5/2002 | Okamoto et al. |

* cited by examiner

Viewing angle of horizonal direction

Viewing angle of vertical direction

Viewing angle of diagonal direction

Viewing angle of horizonal direction

Viewing angle of vertical direction

Viewing angle of vertical direction

LIQUID CRYSTAL DISPLAY WITH A WIDE VIEWING ANGLE USING A COMPENSATION FILM Cross Reference to Related Applications This is a continuation application of the U.S. patent application Ser. No. 10/713,426 filed on Nov. 17, 2003, now U.S. Pat. No. 7,123,329 which is a continuation application of U.S. patent application Ser. No. 09/879,119 filed on Jun. 13, 2001 and issued as U.S. Pat. No. 6,671,017.

This application claims the benefit of Korean Patent Application No. 2000-32506, filed on Jun. 13, 2000, which is hereby incorporated by reference for all purposes as if fully set forth herein.

BACKGROUND OF THE INVENTION (a) Field of the Invention

The present invention relates to a liquid crystal display having a wide viewing angle and using a compensation film.

(b) Description of the Related Art

Liquid crystal displays are typically structured including two substrates provided substantially in parallel with a predetermined gap therebetween, and liquid crystal material is injected between the opposing substrates. Each substrate includes an electrode and an electric field is formed between the substrates by applying a voltage of a different potential to the electrodes. Accordingly, the alignment of liquid crystal molecules of the liquid crystal material changes to control the transmittance of incident light, thereby showing images.

Various types of liquid crystal displays have been developed to improve response times and viewing angle. They include the HAN (hybrid aligned nematic) mode liquid crystal display and the OCB (optically compensated bend) mode liquid crystal display. The OCB mode LCD is arranged symmetrically about an imaginary center plane between the two substrates and parallel to the same. That is, the liquid crystal molecules are aligned substantially parallel to the substrates, then are increasingly slanted until reaching this center plane where the liquid crystal molecules are substantially perpendicular to the two substrates. A wide viewing angle is achieved as a result. To obtain such a bent alignment of the liquid crystal molecules, a horizontal orientation agent that is oriented in the same direction is used and a high voltage is initially applied. Also, the move of liquid crystal molecules in the same orientation when operating, realizes a wide viewing angle as well as fast response times.

However, since liquid crystal material has a birefringence where a refraction index of long axes of the liquid crystal molecules is different from that of short axes of the liquid crystal molecules, a different viewing angle may generate a different refraction index. Accordingly, the ratio of polarization becomes different when the linearly polarized light passes through the liquid crystals. Thus, the amount and color characteristics of the light vary depending on the viewing angle. Hence, color shifting, gray inversion and variations in a contrast ratio happen in the LCD as the viewing angle changes.

An OCB mode LCD is disclosed in U.S. Pat. Nos. 5,410,422 and 5,805,253, in which a compensation film is used to compensate for a phase difference in liquid crystal cells. In these applications, a change in phase of light in liquid crystals is compensated in an opposite direction by the compensation film to solve the viewing angle problem. Here, a uniaxial or biaxial compensation film is used. In U.S. Pat. No. 5,410,422, a retardation value of the uniaxial compensation film is limited to 60-85% of a retardation value of the liquid crystal cells, while a phase difference value of the biaxial compensation film of U.S. Pat. No. 5,805,253 is limited to 0-100 nm.

SUMMARY OF THE INVENTION

The present invention has been made in an effort to solve the above problems.

It is an object of the present invention to provide a liquid crystal display having a wide viewing angle that uses a compensation film, which minimizes color shifting and prevents gray inversion.

To achieve the above object, the present invention provides a liquid crystal display comprising a liquid crystal cell including a pair of transparent substrates with orientation layers deposited on inner surfaces thereof, and a liquid crystal layer realized through liquid crystal material injected between the substrates; biaxial compensation films provided on outer surfaces of the liquid crystal cell, the biaxial compensation films including an optical dielectric material layer; and polarization plates provided on outer surfaces of the biaxial compensation films, wherein if "d" is set as a cell gap of the liquid crystal cell, "$R_{LC}$" is set as a phase retardation value of the liquid crystal layer, an axis perpendicular to planes made by the substrates is set as a z-axis, x-axis and y-axis are formed on a planar surface of the substrates, and refractive indexes of molecules comprising the biaxial compensation films in the x, y and z directions are denoted by nx, ny and nz, retardation values (ny−nx)*d and (nz−nx)*d of the biaxial compensation films being respectively within ranges of −30±5 nm and −$R_{LC}$/4±15 nm.

According to a feature of the present invention, liquid crystal molecules of the liquid crystal layer have a symmetrically bent alignment about an imaginary axis parallel and equidistant to the pair of substrates.

According to another feature of the present invention, the material layer of the biaxial compensation films is an optical dielectric material having a negative anisotropy.

According to yet another feature of the present invention, the liquid crystal display further comprises hybrid C plate compensation films provided between the liquid crystal cell and the biaxial compensation films.

In another aspect, the present invention provides a liquid crystal display comprising a liquid crystal cell including a pair of transparent substrates with orientation layers deposited on inner surfaces thereof, and a liquid crystal layer realized through liquid crystal material injected between the substrates; biaxial compensation films provided on at least one outer surface of the liquid crystal cell, the biaxial compensation films including an optical dielectric material layer; and polarization plates provided on outer surfaces of the biaxial compensation films, wherein if "d" is set as a cell gap of the liquid crystal cell, "$R_{LC}$" is set as a phase retardation value of the liquid crystal layer, an axis perpendicular to planes made by the substrates is set as a z-axis, x-axis and y-axis are formed on a planar surface of the substrates, and refractive indexes of molecules comprising the biaxial compensation films in the x, y and z directions are denoted by nx, ny and nz, retardation values (ny−nx)*d and (nz−nx)*d of the biaxial compensation films being respectively within ranges of −60±10 nm and −$R_{LC}$/2±30 nm.

According to a feature of the present invention, liquid crystal molecules of the liquid crystal layer have a symmetrically bent alignment about an imaginary axis parallel and equidistant to the pair of substrates.

According to another feature of the present invention, the material layer of the biaxial compensation films is an optical dielectric material having a negative anisotropy.

According to yet another feature of the present invention, the liquid crystal display further comprises hybrid C plate compensation films provided between the liquid crystal cell and the biaxial compensation films.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
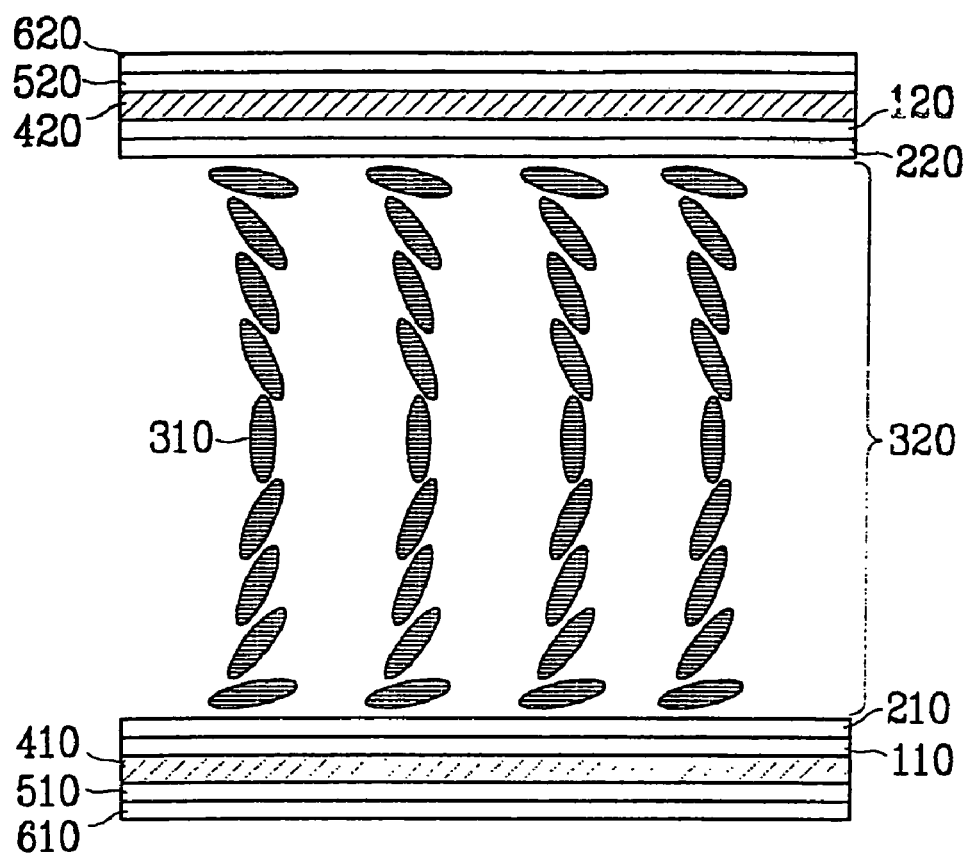
FIG. 1 is a partial sectional view of a liquid crystal display having a bent alignment of liquid crystal molecules according to a preferred embodiment of the present invention.

FIG. 1 shows a partial sectional view of a liquid crystal display having a bent alignment of liquid crystal molecules according to a preferred embodiment of the present invention.

As shown in the drawing, a liquid crystal display of the present invention includes a pair of opposing transparent insulating substrates 110 and 120; orientation layers 210 and 220 formed on inner surfaces of the substrates 110 and 120, respectively; a liquid crystal layer 320 formed of liquid crystal material injected between the substrates 110 and 120, the liquid crystal material being comprised of liquid crystal molecules 310; hybrid C plate compensation films 410 and 420 formed on outer surfaces of the substrates 110 and 120, respectively; biaxial compensation films 510 and 520 provided on outer surfaces of the hybrid C plate compensation films 410 and 420, respectively; and polarization plates 610 and 620 provided on outer surfaces of the biaxial compensation films 510 and 520, respectively.

The liquid crystal layer 320 has a positive dielectric anisotropy. If a critical voltage is applied to the liquid crystal layer 320, the liquid crystal molecules 310 adjacent to the substrates 110 and 120 are aligned to a pretilt angle with respect to the substrates 110 and 120 as a result of properties of the liquid crystal molecules 310 and an orientation force of the orientation layers 210 and 220. Further, as approaching an imaginary plane, which is positioned parallel to the substrates 110 and 120 at a center thereof, the liquid crystal molecules 310 are increasingly bent by the decreasing influence of the orientation force and the increasing influence of an electric field vertical to the substrates 110 and 120. Accordingly, a symmetrical arrangement about the imaginary plane is formed by the liquid crystal molecules 310, resulting in two distinct regions. As a result of this alignment, a phase retardation of light passing through the liquid crystal layer 320 is compensated symmetrically about the imaginary plane such that a wide viewing angle is obtained.

The orientation layers 210 and 220 are horizontal orientation layers that provide an orientation force to the liquid crystal molecules 310 in a direction horizontal to the substrates 110 and 120. The orientation layers 210 and 220 undergo an orientation process such that they provide an orientation force in the same direction, thereby obtaining the symmetrical arrangement of the liquid crystal molecules 310 about the imaginary plane.

The hybrid C plate compensation films 410 and 420 are made of a compound material having a negative dielectric anisotropy such as the WV film made by Fuji Film. The hybrid C plate compensation films 410 and 420 align short axes of molecules having a discotic molecule structure such that they have an increasingly larger angle with respect to a line normal to the substrates 110 and 120.

If an axis perpendicular to planes made by the substrates 110 and 120 is set as a z-axis, x-axis and y-axis are formed on a planar surface of the substrates 110 and 120, and refractive indexes of molecules comprising the compensation films 510 and 520 in the x, y and z directions are denoted by nx, ny and nz, the biaxial compensation films 510 and 520 are structured such that nx>ny>nz. Retardation values (ny−nx)*d and (nz−nx)*d of the biaxial compensation films 510 and 520 are respectively within ranges of −30±5 nm and $-R_{LC}/4\pm15$ nm. And when only one of the two biaxial compensation films 510 and 520 is used, retardation values (ny−nx)*d and (nz−nx)*d are respectively in the ranges of −60±10 nm and $-R_{LC}/2\pm30$ nm. This will be described in more detail hereinafter using results of an experiment as an example. Here, "d" refers to a cell gap of liquid crystal cells and "$-R_{LC}$" refers to a phase retardation value of the liquid crystal layer 320.

The polarization plates 610 and 620 act to polarize light only in the direction of a transmission axis of the polarizing plates 610 and 620. The transmission axis of the polarizing plates 610 and 620 can be either in a vertical or planar direction, with respect to the substrates 110 and 120.

FIGS. 2, 3, 4A, 4B, 4C, 5, 6, 7, 8A, 8B, 8C, 9, 10, 11 and 12 are views used to describe viewing angle characteristics of the present invention. In the drawings, Theta and Phi refer respectively to an azimuth angle and a polar angle. Also, $CIE_x$ and $CIE_y$ refer to positions of a bright state in the CIE1976 standard color chart. Luminance and Contrast in the drawings have their normal meanings, and $\theta_{max}$ refers to a maximum viewing angle.

In Experiments 1 through 3, the hybrid C plate compensation films 410 and 420 include a liquid crystal layer containing liquid crystal molecules having a discotic molecular structure and a negative anisotropic dielectric value, and a base film containing liquid crystal material. At this time, an angle made by the liquid crystal molecules from the body to an adjacent substrate 110 or 120 slowly increases from 4° to 68°. A direction to which an absolute value of a phase difference is at a minimum is a direction slanted 21° from a vertical surface of the base film. Here, a phase difference of the liquid crystal layer of the hybrid C plate compensation films 410 and 420 is 117 nm, and a phase difference of the base film is 40 nm. Further, a drive voltage used to display a bright state is 2V, while a drive voltage used to display a dark state is 6V.

Experiment 1

FIGS. 2, 3, 5, 6 and 7 show pictures of a dark state, bright state and contrast ratio of Experiment 1. FIGS. 4A, 4B and 4C illustrate a gray inversion of the Experiment of FIG. 3 according to angle variations with respect to a horizontal direction, vertical direction and a diagonal direction. FIGS. 8A, 8B and 8C illustrate a gray inversion of the experiment of FIG. 5 according to angle variations with respect to a horizontal direction, vertical direction and a diagonal direction.

In Experiment 1, a dark state, a bright state and a contrast ratio are measured as a phase difference of the biaxial compensation films 510 and 520 (FIG. 1) is varied in the case where a liquid crystal cell gap is 6.0 μm and a refractive index dielectric value of the liquid crystal layer 320 (FIG. 1) is 0.15.

Figure 2:
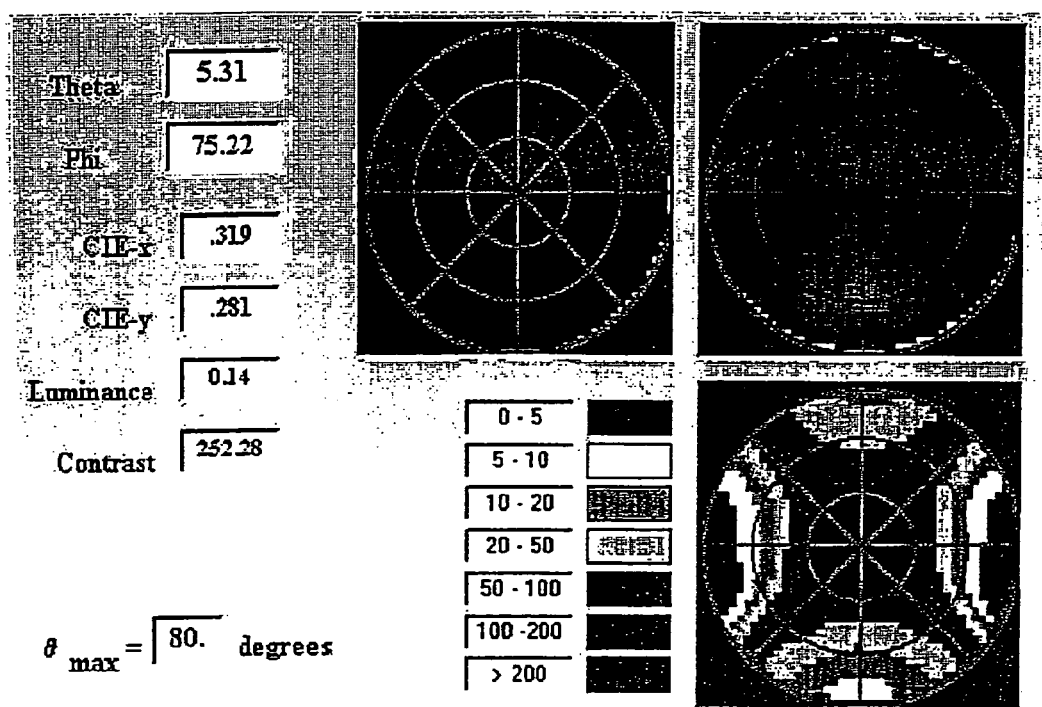
FIGS. 2, 3, 4A, 4B, 4C, 5, 6, 7, 8A, 8B, 8C, 9, 10, 11 and 12 describe viewing angle characteristics of the present invention.

FIG. 2 shows pictures of viewing angle characteristics when a planar phase difference (ny−nx)*d of the biaxial compensation films 510 and 520 (FIG. 1) is −4 μm and a phase difference (nz−nx)*d in a normal direction is −228 μm. As shown in the drawing, in the dark state, light leaks a lot and a contrast ratio is measured less than 10 at a viewing angle of 80°.

Figure 3:
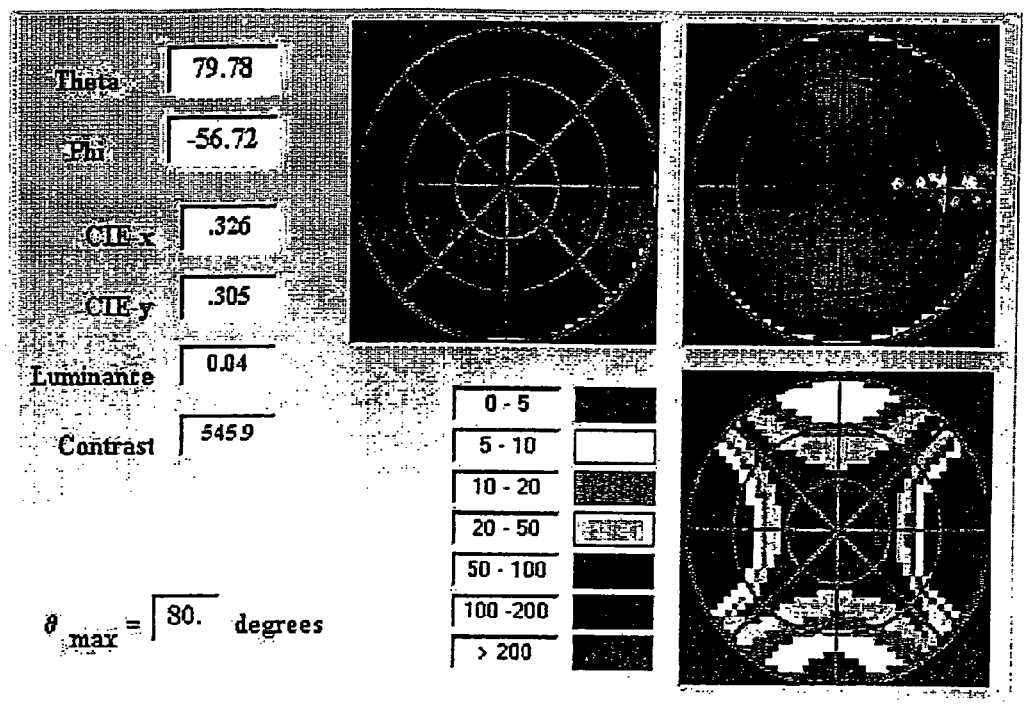
Figure 4A:
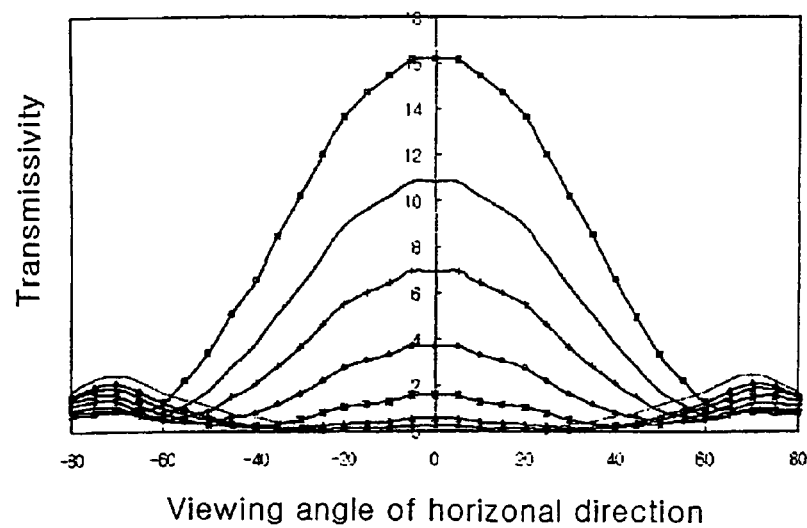
Figure 4B:
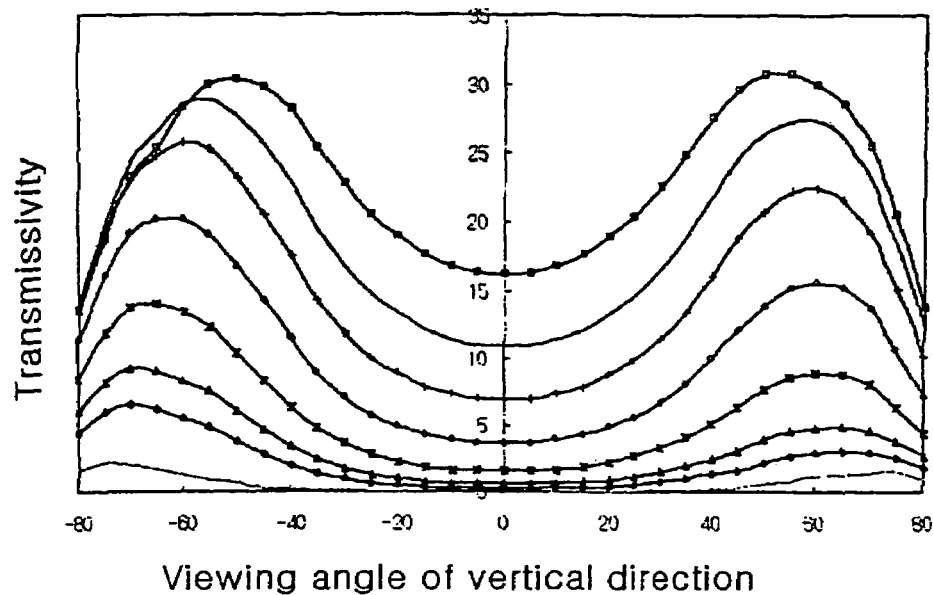
Figure 4C:
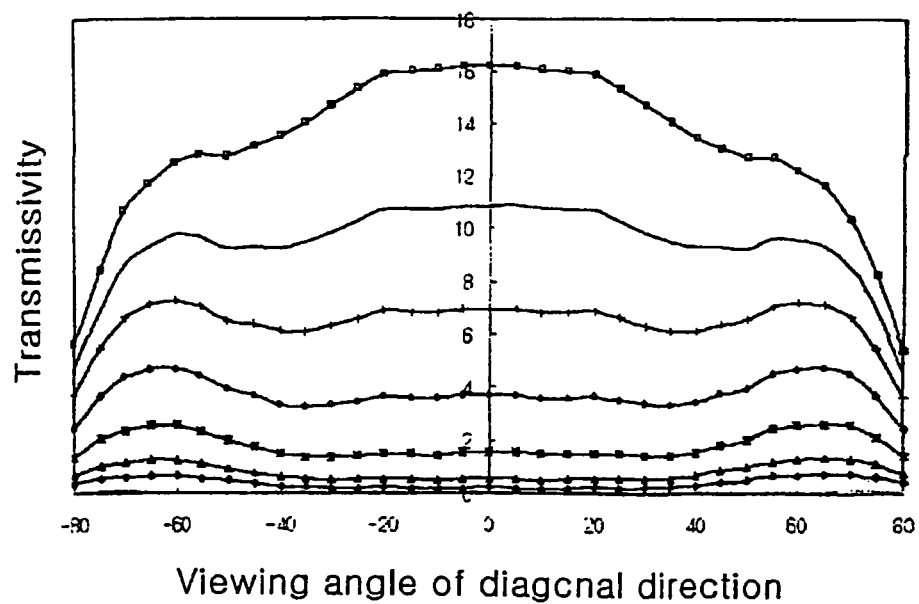

FIG. 3 shows pictures of viewing angle characteristics when the planar phase difference (ny−nx)*d of the biaxial compensation films 510 and 520 (FIG. 1) is −10 μm and the phase difference (nz−nx)*d in a normal direction is −300 μm. As shown in the drawing, in the bright state, light leaks a lot and a contrast ratio is measured less than 10 at a viewing angle of 80°. Further, with reference to FIG. 4A, it is evident from transmissivity measurements that gray inversion occurs.

Figure 5:
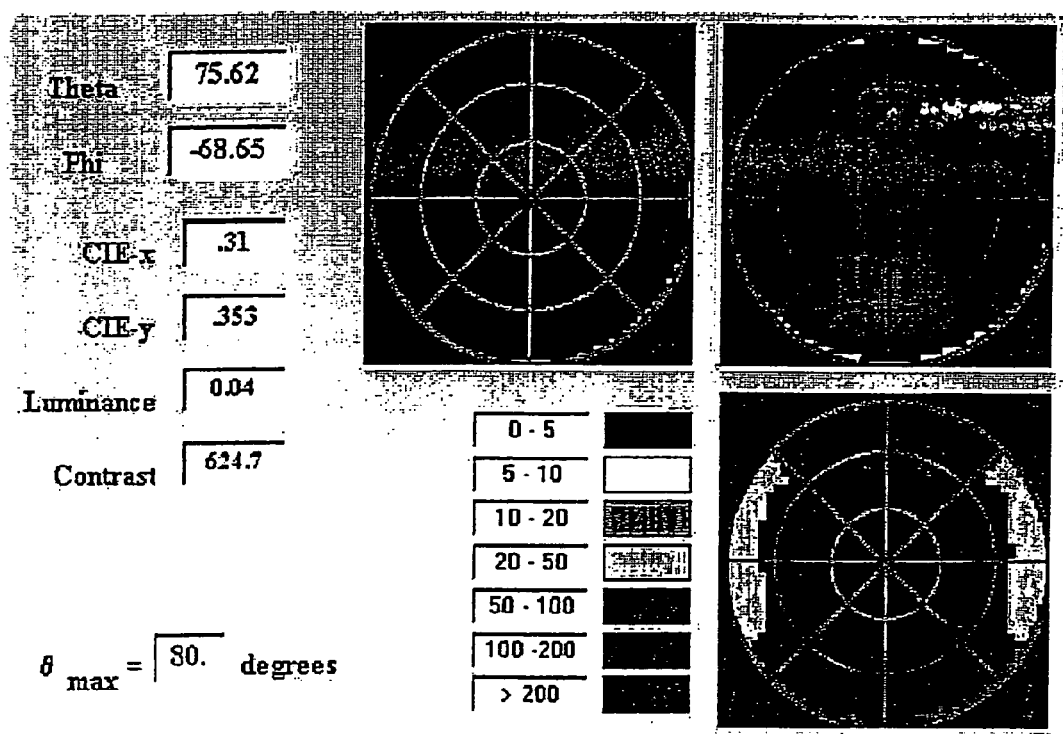

FIG. 5 shows pictures of viewing angle characteristics when the planar phase difference (ny−nx)*d of the biaxial compensation films 510 and 520 (FIG. 1) is −30 μm at −30±5 nm and the phase difference (nz−nx)*d in a normal direction is −228 μm in the range of −$R_{LC}$/4±15 nm. As shown in the drawing, the leakage of light in the dark and bright states is reduced, and a contrast ratio of greater than 20 is obtained at a viewing angle of 80°. Further, with reference to FIG. 8A, it is evident that gray inversion does not occur.

Figure 6:
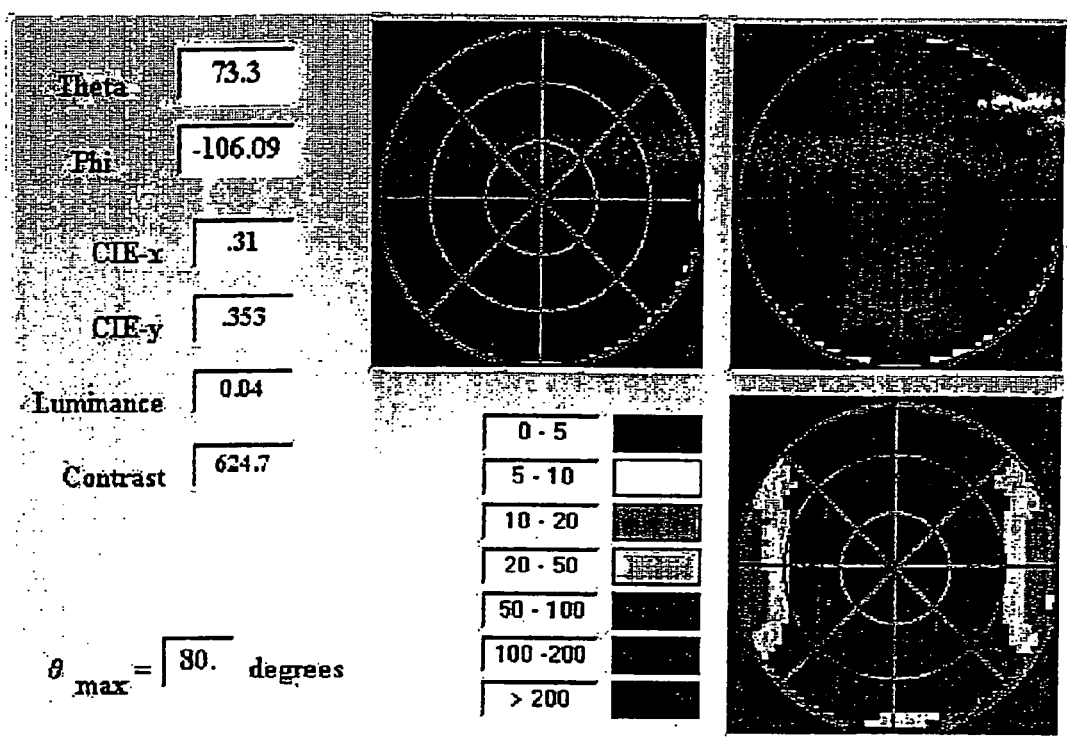
Figure 7:
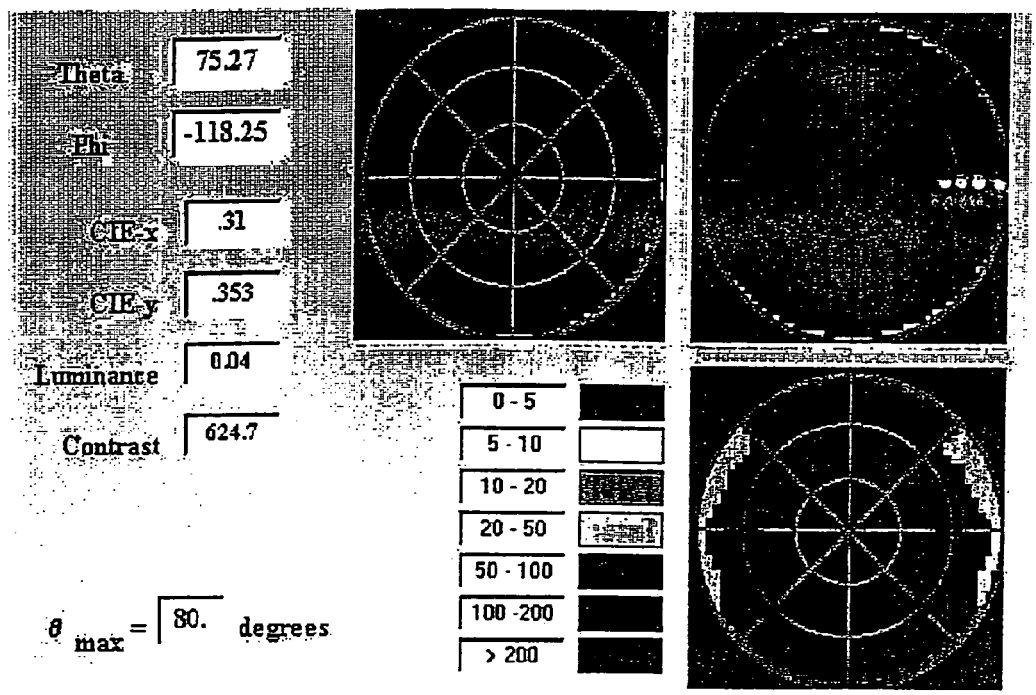
Figure 8A:
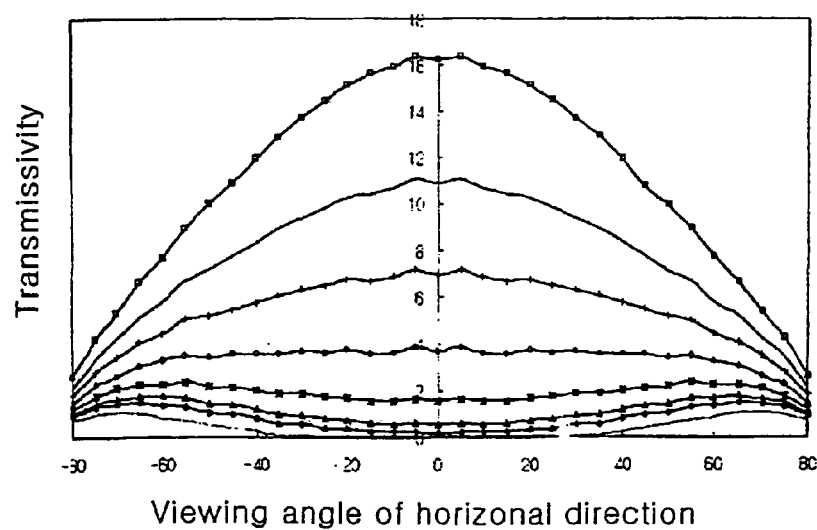
Figure 8B:
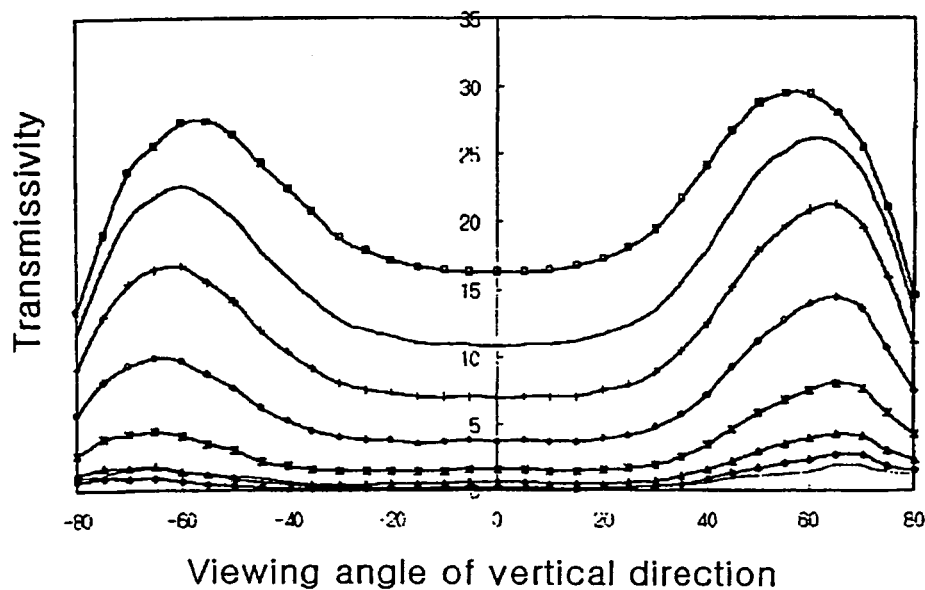
Figure 8C:
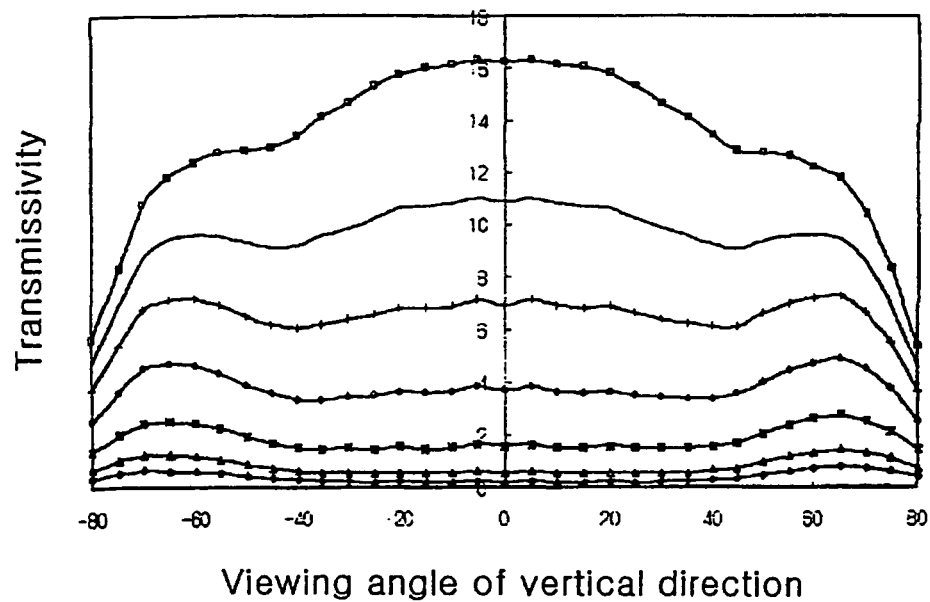

FIGS. 6 and 7 show pictures of viewing angle characteristics when the planar phase difference (ny−nx)*d of the biaxial compensation films 510 and 520 (FIG. 1) is −30 μm and the phase difference (nz−nx)*d in a normal direction is −218 μm and −238 μm. As shown in the drawings, the leakage of light in the dark and bright states is reduced when compared to FIGS. 2 and 3, and a contrast ratio of greater than 10 and 20 is obtained at a viewing angle of 80°.

Experiment 2

Figure 9:
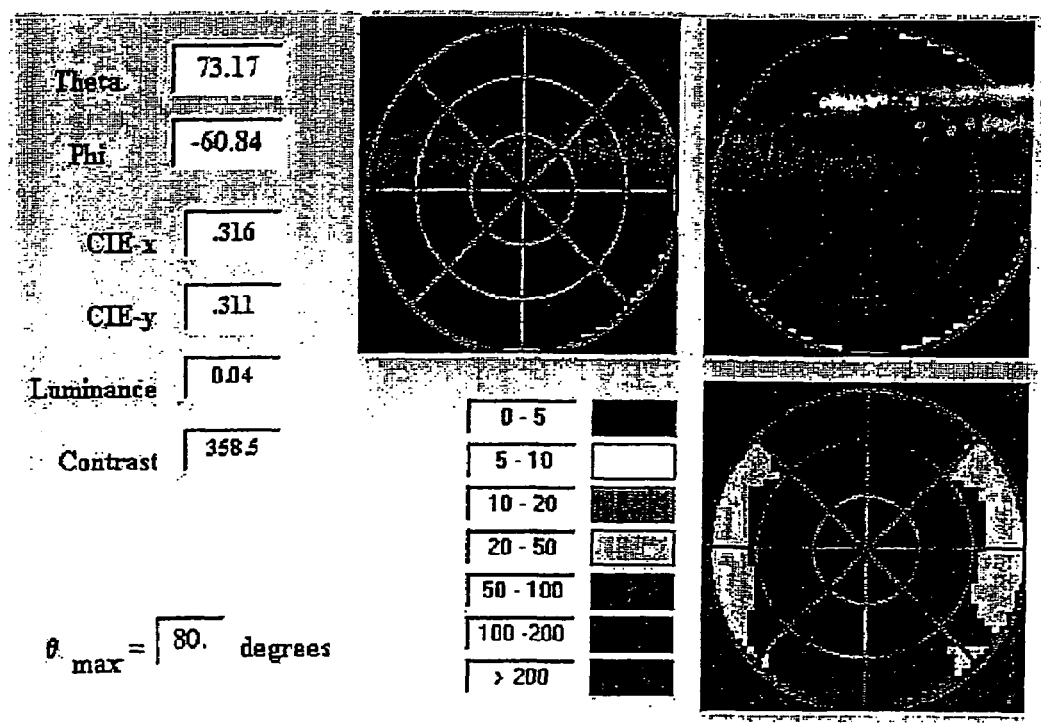
Figure 10:
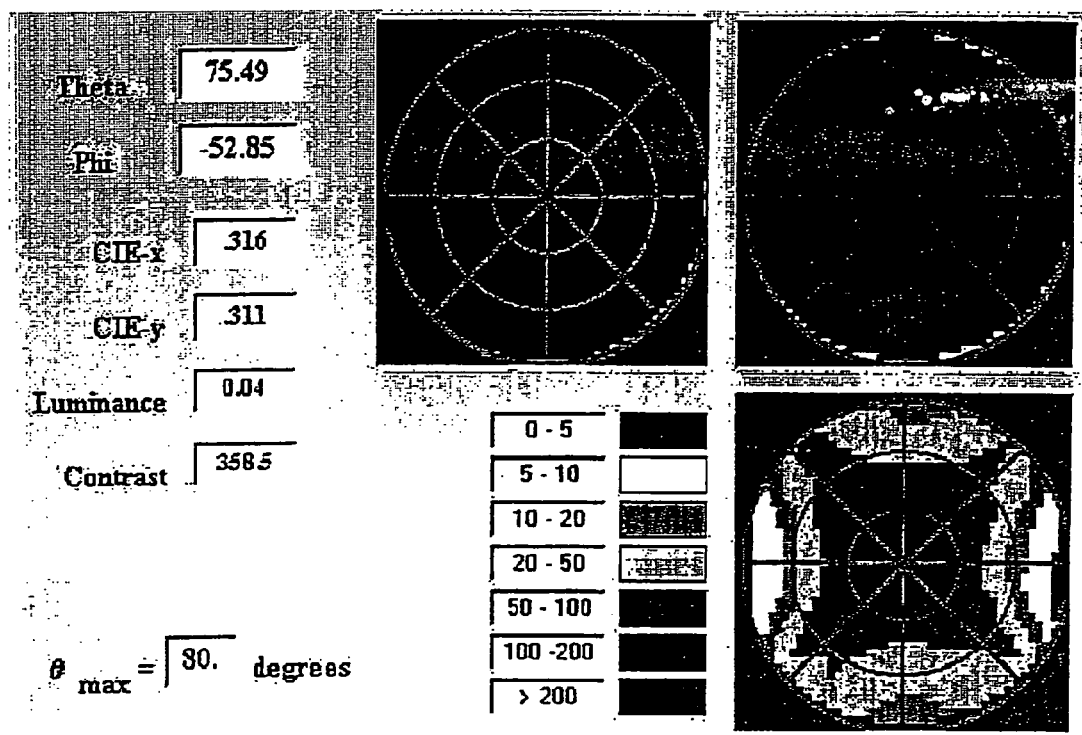

FIGS. 9 and 10 show pictures of a dark state, bright state and contrast ratio of Experiment 2. In Experiment 2, a dark state, a bright state and a contrast ratio are measured as the phase difference of the biaxial compensation films 510 and 520 (FIG. 1) is varied in the case where a liquid crystal cell gap is 6.0 μm and a refractive index dielectric value of the liquid crystal layer 320 (FIG. 1) is 0.12. The hybrid C plate compensation films 410 and 420 (FIG. 1) are identical to Experiment 1.

FIG. 9 shows pictures of viewing angle characteristics in the case where the planar phase difference (ny−nx)*d of the biaxial compensation films 510 and 520 (FIG. 1) is −35 μm at −30±5 nm and the phase difference (nz−nx)*d in a normal direction is −180 μm in the range of −$R_{LC}$/4±15 nm. As shown in the drawing, the leakage of light in the dark and bright states is reduced, and a contrast ratio of greater than 20 is obtained at a viewing angle of 80°.

FIG. 10 shows pictures of viewing angle characteristics in the case where the planar phase difference (ny−nx)*d of the biaxial compensation films 510 and 520 (FIG. 1) is −35 μm at −30±5 nm and the phase difference (nz−nx)*d in a normal direction is −148 μm in the range of −$R_{LC}$/4±15 nm. As shown in the drawing, an extremely poor contrast ratio is obtained at a viewing angle of 80°.

Experiment 3

Figure 11:
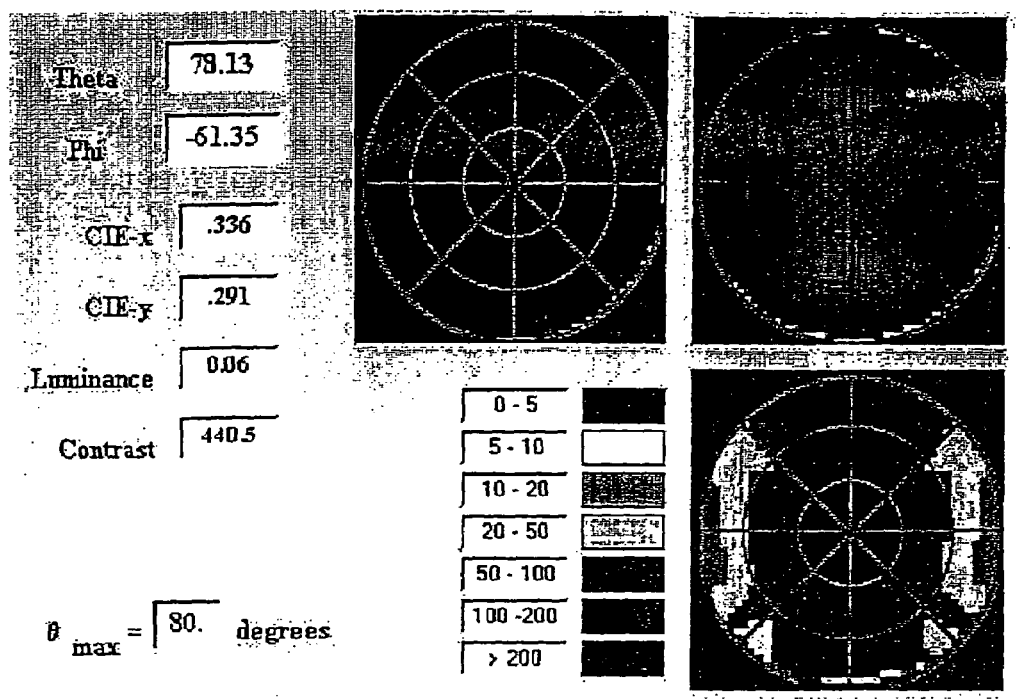
Figure 12:
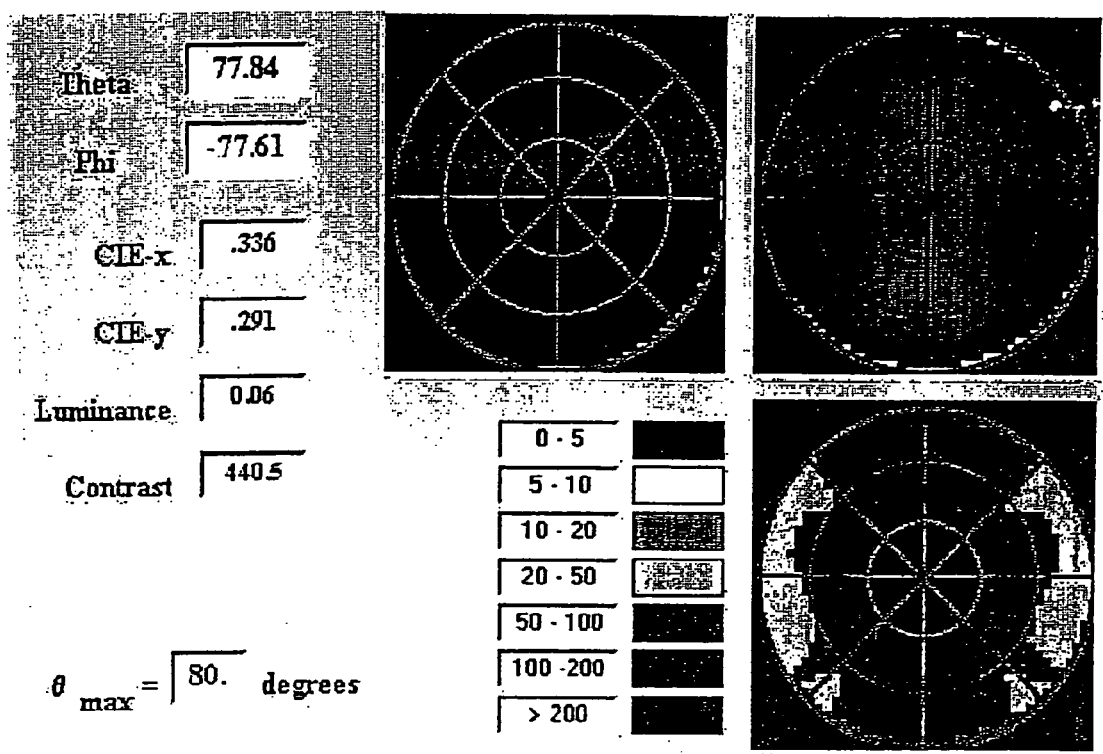

FIGS. 11 and 12 show pictures of a dark state, bright state and contrast ratio of Experiment 3. In Experiment 3, a dark state, a bright state and a contrast ratio are measured as the phase difference of the biaxial compensation films 510 and 520 (FIG. 1) varies when a liquid crystal cell gap is 6.0 μm and a refractive index dielectric value of the liquid crystal layer 320 (FIG. 1) is 0.167. The hybrid C plate compensation films 410 and 420 (FIG. 1) are identical to Experiments 1 and 2.

FIGS. 11 and 12 show pictures of viewing angle characteristics in the case where the planar phase difference (ny−nx)*d of the biaxial compensation films 510 and 520 (FIG. 1) is −30 μm at −30±5 nm and the phase difference (nz−nx)*d in a normal direction is −255 μm and −265 μm in the range of −$R_{LC}$/4±15 nm. As shown in the drawings, the leakage of light in the dark and bright states is reduced, and a contrast ratio of greater than 10 and 20 is obtained at a viewing angle of 80°.

In the liquid crystal display of the present invention described above, with the use of the biaxial compensation films of a planar phase difference (ny−nx)*d in the range of −60±10 nm and a phase difference (nz−nx)*d in a normal direction in the range of −$R_{LC}$/2±30 nm, a wide viewing angle and a high contrast ratio are obtained. Further, color shifting is minimized and gray inversion is prevented.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display, comprising:
a first insulating substrate;
a first orientation layer formed on the first insulating substrate;
a first compensation film formed on an outer surface of the first insulating substrate;
a first biaxial compensation film formed on the first compensation film, wherein the first biaxial compensation film has a retardation value of about −$R_{LC}$/4±15 nm wherein $R_{LC}$ is a phase retardation value of the liquid crystal layer;
a first polarizer plate formed on the first biaxial compensation film;
a second insulating substrate facing the first insulating substrate;
a second orientation layer formed on the second insulating substrate;
a second compensation film formed on an outer surface of the second insulating substrate;
a second biaxial compensation film formed on the second compensation film;
a second polarizer plate formed on the second biaxial compensation film; and
a liquid crystal layer arranged between the first orientation layer and the second orientation layer, wherein a cell gap of a predetermined distance is formed between the first insulating substrate and the second insulating substrate.

2. The liquid crystal display of claim 1, wherein the second biaxial compensation film has a retardation value of about −30 ±5 nm.

3. The liquid crystal display of claim 2, wherein the first compensation film and second compensation film are hybrid C plate compensation films.

4. The liquid crystal display of claim 3, wherein the hybrid C plate compensation films align short axes of liquid crystal molecules of the liquid crystal layer in a direction having a greater angle with the respect to an imaginary normal axis between the first insulating substrate and the second insulating substrate.

5. The liquid crystal display of claim 1, wherein the predetermined distance is about 6 μm.

6. The liquid crystal display of claim 1, wherein the liquid crystal layer has a refractive index dielectric value of about 0.15.

7. The liquid crystal display of claim 1, wherein the liquid crystal layer comprises liquid crystals having a discotic molecular structure and a negative anisotropic dielectric value.

8. The liquid crystal display of claim 1, wherein the first orientation layer is a horizontal orientation layer configured to provide an orientation force onto liquid crystal molecules in the liquid crystal layer and the orientation force is in a substantially horizontal direction relative to the first insulating substrate.

* * * * *